Figure 1:
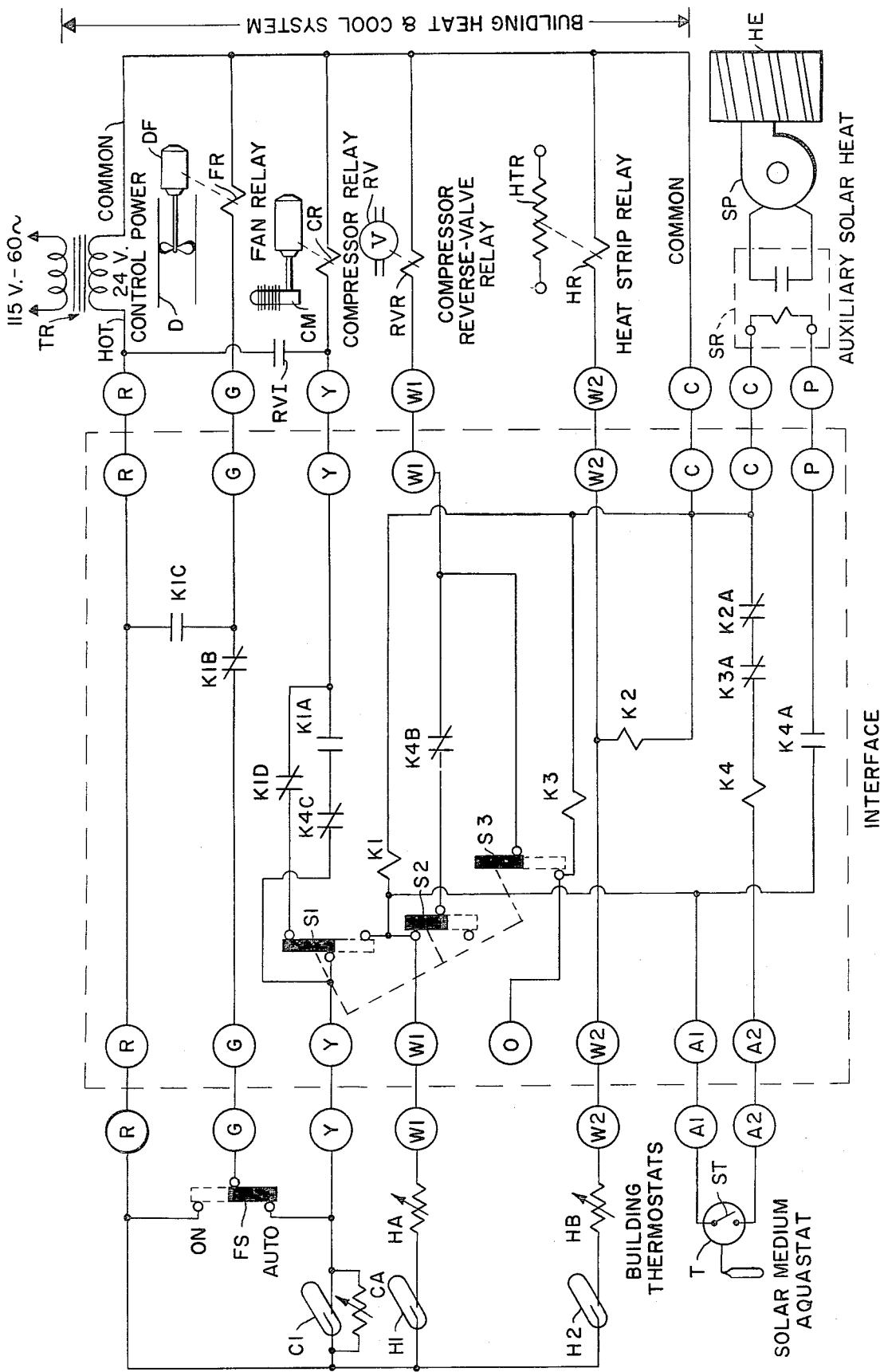

United States Patent [19]

Bowden et al.

[11] 4,231,352
[45] Nov. 4, 1980

[54] INTERFACE CIRCUIT FOR ADDING SOLAR HEAT TO A BUILDING HEATING AND COOLING SYSTEM

[75] Inventors: Donald R. Bowden; Robert O. Sparks, both of Huntsville, Ala.

[73] Assignee: Solar Unlimited, Inc., Huntsville, Ala.

[21] Appl. No.: 55,127

[22] Filed: Jul. 5, 1979

[51] Int. Cl.³ .................. F24J 3/02; G05D 23/00
[52] U.S. Cl. ...................... 126/422; 126/427; 126/428; 126/432; 165/29; 236/91 D; 236/91 F; 237/2 B
[58] Field of Search ........... 237/2 B; 236/91 D, 91 F; 165/29; 62/2; 126/427, 428, 421, 422, 423, 432

[56] References Cited

U.S. PATENT DOCUMENTS

| | | | |
|---|---|---|---|
| 3,028,093 | 4/1962 | Miller | 236/91 F |
| 3,977,601 | 8/1976 | Bearzi | 126/427 |
| 4,034,738 | 7/1977 | Barber | 126/422 |
| 4,034,912 | 7/1977 | Hayes | 126/422 |
| 4,052,000 | 10/1977 | Honikman | 126/427 |
| 4,179,894 | 12/1979 | Hughes | 62/2 |
| 4,190,199 | 2/1980 | Cawley | 237/2 B |

Primary Examiner—James C. Yeung
Assistant Examiner—Daniel O'Connor
Attorney, Agent, or Firm—Dowell & Dowell

[57] ABSTRACT

An interface circuit for adding a solar heat system to a building having a building heating and cooling system and having a building thermostat system, the interface circuit being especially wired to be compatibly interposed between the building thermostat system and the building heating and cooling system without rewiring the latter and being also connected to the solar heat system, the interface circuit thereby adding the solar system as a heat source, and the interface circuit automatically substituting the solar source for the building heating system when heat is called for at a level within the capability of the solar system to supply.

3 Claims, 2 Drawing Figures

INTERFACE CIRCUIT FOR ADDING SOLAR HEAT TO A BUILDING HEATING AND COOLING SYSTEM

FIELD OF INVENTION

This invention relates to an interface control circuit to be interposed between existing building thermostats and an existing building heating and cooling system, and to be connected to an auxiliary solar heating system to make the latter compatible in operation with the building system and automatically controlled by its existing thermostats.

BACKGROUND AND PRIOR ART

It is well known that great effort is being made to conserve power, and part of the conservation is accomplished by using more solar energy. Accordingly, many buildings which have been previously heated entirely by consumable fuels are now being converted so that solar sources may be used whenever their energy is adequate for the purpose. Efficient use of this energy requires achieving a degree of automatic control, and also achieving compatible operation between, on the one hand the main heating and cooling system of a building and its already existing thermostats, and on the other hand an auxiliary solar heating source newly added to the building.

The prior art shows various circuits for controlling operation of an auxiliary solar heating system together with a conventional building heating and/or cooling system.

U.S. Pat. No. 4,034,912 to Thomas Edward Hayes teaches a method and apparatus for combining a solar heating system with a fuel fired heating system for the purpose of substituting the solar source for the fuel burning source whenever the energy in the solar source appears adequate to supply the required heat. This system provides a microprocessor control circuit which integrates the two systems together, as distinguished from an interface according to the present invention which introduces an auxiliary solar source into an existing system without requiring extensive rewiring of the latter.

U.S. Pat. No. 4,034,738 to Everett M. Barber, Jr. provides a heating system in which a control system seeks first to heat the building with solar energy, but failing that effort changes over to a fuel burning system if the thermostat continues to fall. No interface system is provided for adapting an auxiliary solar system to an existing building heating and air conditioning system without rewiring the latter. U.S. Pat. No. 3,977,601 to Vittorio Bearzi is of a similar type showing, however, the use of a fuel burning system to supplement the solar source.

U.S. Pat. No. 3,028,093 to Richard D. Miller shows a system which controls several separate fuel burning heating systems from a common thermostat while at the same time compensating the current through the anticipator of the thermostat so that the thermostat sees substantially the same current regardless of whether one, or several of the heating systems, is at the moment being operated. The patent does not show an auxiliary solar system in combination.

U.S. Pat. No. 4,052,000 to Terrence C. Honikman shows interfacing of a solar water heater with an existing electrical water heater by interposing a control logic circuit which is responsive to the temperature in the solar system as one criterion for substitution.

THE INVENTION

The present invention provides an interface control circuit having terminals which are appropriate for interposing of the interface circuit between an existing building thermostat system and the control relays of an existing building heating and cooling system. Since there are several common types of thermostats which are normally used in buildings, the interface circuit is provided with terminals suitable for receiving connections from different conventional systems, and the circuitry within the interface is such as to make it operable with most common thermostat systems. Likewise, the interface has output terminals which can be connected directly to the relays controlling the building heating and cooling system, including relays for controlling a compressor in a reversible heat pump system, a relay for controlling a reversing valve for such a compressor so that it can perform either heating or cooling functions for the building, a relay for controlling a building duct air circulating fan, a relay for controlling a building electrical heat strip, and terminals for receiving control power from an existing control transformer of the 24 volt type also comprising a part of the conventional building system. In addition, the interface circuit has terminals for connection to a relay for controlling the circulation of a solar heating medium, and also has terminals for connection to an aquastat immersed in the solar medium for determining whether the medium has stored sufficient energy to make its use efficient.

As pointed out above, various different circuits appear in conventional systems. Therefore the interface has switch means which can be selectively moved to one of several positions so as to alter the circuitry within the interface and make it compatible with several different types of common heating and cooling systems and common thermostat systems, the switch being properly set at the time of installation of the interface, depending on the type of pre-existing building equipment with which the auxiliary solar system must be compatible.

OBJECTS AND ADVANTAGES

It is an important object of the present invention to provide an interface circuit having terminals designed to correspond with, and labelled to match, the terminals of conventional existing thermostat systems and existing heating and cooling systems used in buildings, whereby existing thermostats can supply all functions needed to control a heating and cooling system to which an auxiliary solar heating source has been added. It is a corollary object to provide an interface control circuit which uses the existing 24 volt control transformer in the building to supply the power needed to operate the control relays for the interface unit and for the auxiliary solar source.

It is another important object of the invention to provide an interface control unit which adds a very small load to the existing 24 volt control power transformer, the additional load being under 6% of the normal transformer load, which is low enough so that the existing system transformer is not likely to be overloaded.

It is a further object of the invention to provide an interface system wherein the heating and cooling anticipators in the existing thermostat will function in their normal manner whether the system is operating the conventional heating and cooling system of the building or whether it is operating the auxiliary solar energy source. In either event, the amount of current drawn through the heating and cooling anticipators is such that it is within normal adjustment tolerances for proper setting of the anticipators, whereby their calibration is not upset by the additional auxiliary solar source.

A major object of the invention is to provide an interface control system operative to substitute an auxiliary solar energy source for the fuel consuming source of an existing conventional system, which conventional source is disabled when the solar source is substituted. This substitution is made only if the temperature of the storage medium for the auxiliary solar source is sufficient to provide adequate heat. If the temperature of the solar medium falls below a preset level, the auxiliary solar source is automatically disabled and operation of the conventional heating system is restored. It is a feature of this invention that only one or the other of the heat sources can be operated at one time, because simultaneous operation of both systems would be likely to cause damage. For instance, in the case of a building having a hot air duct system circulated by a circulation fan, the solar source heat exchanger would probably be operated in the same ductwork in series with the conventional heating system, usually ahead of the conventional heating system. Care must be taken to ensure that the conventional heating source is not operating when the solar heating source is putting heat into the duct upstream from it, since the conventional heating system is designed to receive air entering the duct at room temperature. If the entering air were preheated by an upstream solar source the air entering the conventional system would then be well above 80° F., which would cause the conventional heating system to overheat. It is also necessary to be sure to disable the solar heating system before operating the air cooling mode of the conventional system, since the compressor would operate at a much higher head pressure and heat up if the air coming into the duct were solar preheated and therefore excessively hot, rather than at room temperature. The interface system is therefore provided with relays that are mutually interlocked in such a manner that it is impossible for the conventional heating system or the conventional cooling system of the building to be run if the auxiliary solar heat is operative, and vice versa.

A further important object of the invention is to provide an interface operative with a conventional building heating system having both a primary and a secondary heating stage, usually operated by separate heat thermostats. The primary heating stage is usually adequate for heating the building, but the secondary heating stage becomes energized during periods of severe weather to provide an additional amount of heat to supplement the primary heating system. The present interface operates the solar system only when heat demands on it are within its capability to supply, i.e. when the temperature thereof is adequate, and only when the primary heating system is operating by itself, meaning non-severe weather conditions. If conditions become more severe and the second thermostat closes for the secondary heating system in the building, the interface has a relay whose contacts operate to disable the solar heating source and restore the conventional building primary heating source to operation. Thus the solar heating system is used only during relatively non-severe conditions, but if the temperature in the building begins to fall despite adequate temperature in the solar heating medium, then the system automatically adds the secondary heat source and switches back from solar to primary heat source at the same time.

The conventional heating equipment can be either a fuel burning system, an electrically operated system such as a reversible heat pump and/or resistance element heat strips, or a combination thereof in the case of a building heating system having primary and secondary heat sources. It is an advantage of the present system that substitution of the solar source for the conventional heating source can be done to provide peak-hour heating, thereby reducing the cost of energy drawn from utility lines during hours of peak use demand. If desired, additional circuitry can be installed to favor use of solar power during peak utility demand hours.

Still another major object of the invention is to provide an interface circuit in which a switch is provided which is adjustable at the time of installation of the interface to accomodate its circuitry to several different types of conventional building equipment which is already installed. For example, where a reversible heat pump constitutes the conventional source of heat and cooling, such heat pumps commonly come with two different modes of control. In one type of heat pump system, the reversing valve for the compressor must be energized during cooling mode, whereas in the other conventional type of heat pump system the reversible compressor valve must be energized during the heating mode. The switch in the interface allows the interface to be matched to the existing building heating and cooling system without requiring any rewiring of the latter.

Other objects and advantages of the invention will become apparent during the following discussion of the drawings.

THE DRAWINGS

Figure 2:
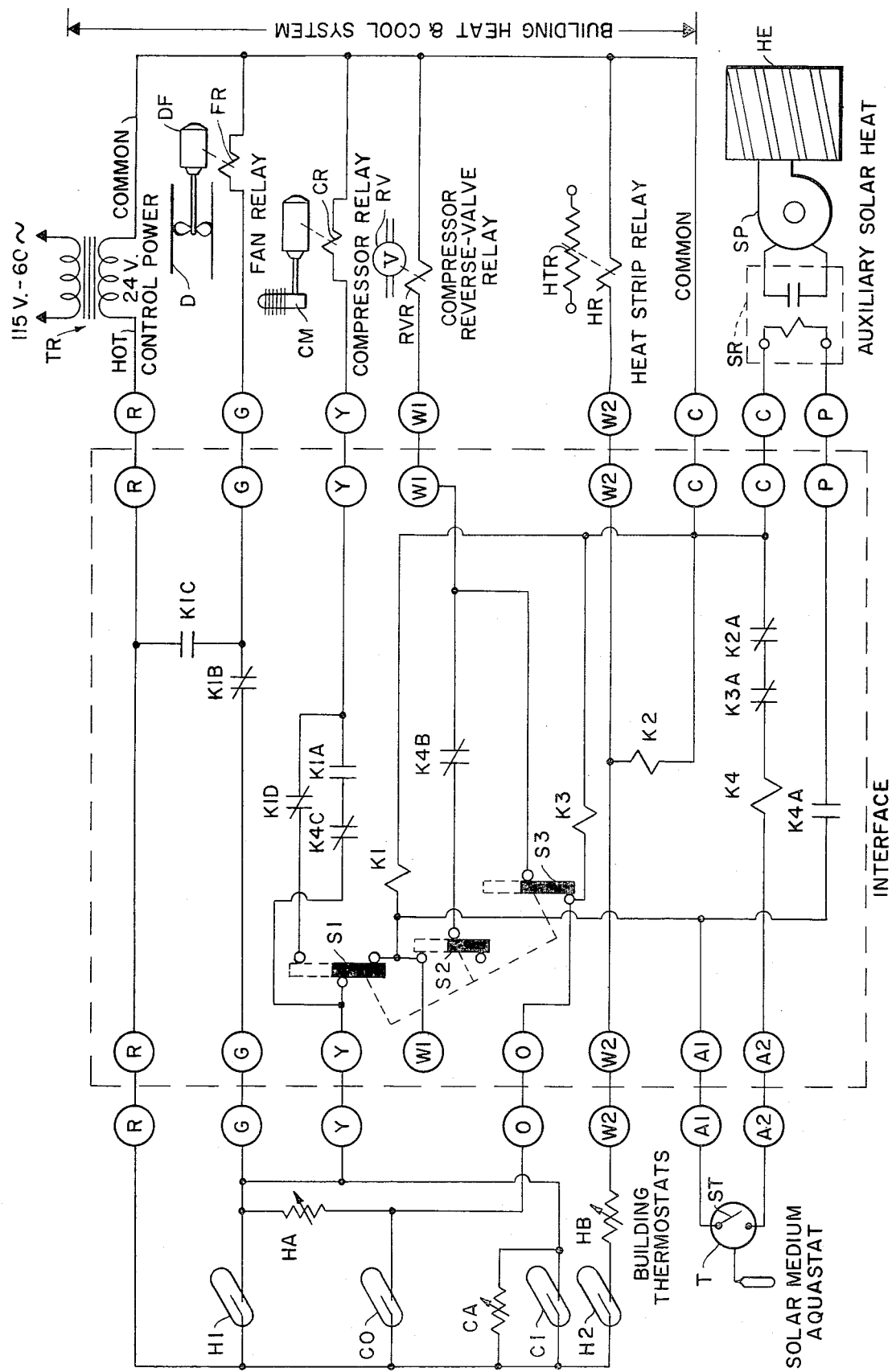

FIG. 1 is a schematic diagram showing an interface circuit according to the present invention connected between a building thermostat system of standard type, and a building heat pump heating and cooling system and an auxiliary solar heating system, the heat pump system being of the type in which the compressor is normally in the cooling mode, but is changed over to the heating mode by energizing a reversing valve; and FIG. 2 is a schematic diagram showing the same interface circuit as shown in FIG. 1 connected between a standard building thermostat system of somewhat different type, and a combined heat pump heating and cooling system and an auxiliary solar heating system, the heat pump system in FIG. 2 being of the type wherein the compressor is normally in the heating mode and is changed over to the cooling mode by energizing a reversing valve.

FIGS. 1 and 2 of the present drawings show the same interface circuit unit made according to the invention and connected between a building thermostat unit and a building heating and cooling system, wherein the heating and cooling systems in the two figures and the thermostats in the two figures are somewhat different but of usual and standard types. The interface is provided with a slide switch S1, S2, S3 which can be moved between two different positions at the time the interface is installed in order to accomodate the different types of heating systems and the different types of thermostats normally encountered.

The building heating and cooling system shown to the right in each of the figures, includes the normal 24 volt transformer TR supplying control power to the various switches and relays in the system. In addition, the building is equipped with a fan DF which is controlled by a fan relay FR which when energized causes the fan to circulate heat through the ducts D within the building. The heat is generated by a reversible heat pump having a compressor CM which is controlled by a compressor relay CR, and a reversing valve relay RVR controls the position of a reversing valve RV of the compressor to select between a cooling mode in which cool air is pumped into the house ducts D and heat is dissipated outside of the house, and a heating mode in which heat is delivered into the house ducts D and is taken from the ambient air outside of the house, all in a manner well known in the prior art. The building heating system may also include a secondary source of heat such as electric heater strips HTR which are controlled by a heat strip relay HR. The compressor CM, the fan DF, and the reversing valve RV, and the heat strips HTR themselves are only schematically shown in the drawings.

In addition, the building includes a thermostat system which is assumed to be already installed and is shown to the left in the drawings. FIG. 1 includes a cooling thermostat C1 having an anticipator resistor CA connected across it, and the thermostat system further includes a primary heating thermostat H1 having an anticipator resistor HA connected in series with it, the thermostat H1 controlling the compressor when in the heat mode, and the thermostat C1 controlling the compressor when in the cooling mode. The secondary heat strip source HTR is controlled by‘e*second thermostat H2 which likewise has an anticipator HB connected in series with it.

Ordinarily, in the absence of the present interface the terminals R, G, Y, W1, 0 and W2 are connected to similarly labelled terminals of the building heating and cooling system. However, the present interface is installed for the purpose of adding an auxiliary solar heating system to the building. This solar heating system is not shown in detail, but includes suitable solar collectors providing heat to a heat storage device which is not shown, and this heat storage device has a heated liquid medium which is then pumped to a heat exchanger HE which is installed in the building duct system D and has heat circulated from it when the duct fan DF is turned ON. The solar storage medium pump SP is controlled by a relay SR, and the solar system further includes an aquastat T which is immersed in the liquid medium for the solar heat system and includes a switch ST which closes when the medium has a temperature sufficient so that it can serve efficiently as a source of heat for the building.

It is the purpose of the interface system which is shown in the dashed line box in the center of FIG. 1 and FIG. 2 to permit the solar source of building heat to be substituted for the existing building heating system and to be controlled by the existing thermostat system of the building without requiring any changes in the existing wiring of either of those systems. Accordingly, the interface is inserted between the terminals R, G, Y, W1 and W2 as shown in FIG. 1, or between the terminals R, G, Y, 0 and W2 as shown in FIG. 2, these thermostat terminals having been disconnected and separated from the heating and cooling system terminals as shown in the drawings.

Referring to FIG. 1, the particular type of thermostat system shown in that figure includes a manual fan switch FS which can be moved either to a continuously "ON" or to an "AUTOMATIC" position, the fan switch FS being shown in the "AUTOMATIC" position in the present drawings. In this position, the fan runs only when the system is supplying either heating or cooling to the building, whereas in the "ON" position, the fan runs continuously in the building ducts D.

The interface which comprises the subject of the present invention has been carefully designed to be compatible with most building thermostat systems and with most building heating and cooling systems, and it functions to add auxiliary solar heat to the building system. This solar heat can be selected instead of the primary heating system of the building whenever the solar medium temperature as measured by the aquastat T is sufficiently high. The secondary building heating system which can be called into operation when the thermostat H2 is closed supplements the primary heating system controlled by the thermostat H1, but is added to it only during periods when maximum heat is required in the building, i.e. during severe weather conditions. The auxiliary solar heat is substituted for the primary heating system only during milder weather conditions. Therefore, if the thermostat H2 closes, indicating severe conditions, the relay system within the interface operates in such a manner as to disable the auxiliary solar heat source and cause the building heating system to operate using the compressor and the electrical heat strips instead of the solar system.

The interface shown within the dashed line box in the centers of both figures includes a first relay K1 having four contacts, which relay controls the heat pump compressor CM and air circulation fan DF during heating functions in which the compressor is running as a heat pump. The interface further includes a relay K2 having a single contact which disables the solar heat pump and thereby eliminates solar heat as a source whenever severe conditions are encountered, during which time the compressor CM and electrical heat strip HTR system of the main building system are used. Whenever the such conditions are less severe as indicated by opening of the thermostat H2, the relay K2 enables the auxiliary solar heating system again as a possible source of heat, assuming that its storage medium has an adequate temperature. The relay K3 is used only in heat pump systems of the type shown in FIG. 2 which activate a reversing valve during the cooling mode but which require no reversal of the valve during the heating mode. The relay K3 prevents simultaneous solar heating and cooling which would be a highly undesirable combination. Finally, the relay K4 is controlled by the aquastat and serves to enable solar heating or to disable it as a heat source if its temperature is inadequate.

The functioning of the system can be best understood by describing the system in terms of its various functional modes.

With reference to FIG. 1, if the solar storage medium temperature is below a temperature adequate to close the aquastat switch ST, and if primary heating is called for by closing of the thermostat H1, the 24 volt source will supply power through the terminal R at the top of FIG. 1 to the left side of the thermostat H1, which will then deliver power through the terminals W1 to the slide switch S2 within the interface, which has three different switch segments S1, S2 and S3. The purpose of the switch S is to provide easy changeover between the type of reversible heat pump compressor system which is normally in the cooling mode as shown in FIG. 1, and the type of heat pump which is normally in the heating mode as shown in FIG. 2.

Referring to FIG. 1, the power supplied through the input terminal W1 from the hot side of the power transformer TR is delivered to the switch segment S2 and energizes the winding of the relay K1, whose other side is connected to a common terminal C leading directly to the common side of the control power transformer TR. The relay terminals K1A and K1C are normally open and are therefore closed when the winding is energized, whereas the terminals K1B and K1D are normally closed and therefore open when the winding of the relay K1 is energized. Since the relay K4 is deenergized because the aquastat T has been assumed to encounter too low a solar medium temperature, the relay contact K4B will be closed, and therefore power will be supplied through the switch segment S2 to the output terminal W1, thereby energizing the compressor reversing valve relay RVR to put the compressor into the heating mode. The contact RV1 is operated by the relay RVR and turns on the compressor relay CR, thereby starting the compressor CM. Thus, when the thermostat H1 closes, the fan relay FR is energized through the contact K1C, the reversing valve RVR is reversed to the heating mode, and the compressor relay CR is turned on, thereby supplying normal primary stage heating to the building and operating its duct circulating fan DF. The presence of power on the input line W1 from the thermostat H1 also energizes the terminal A1 of the solar medium aquastat, but since the temperature in the solar medium is assumed to be inadequate, no power is delivered to the terminal A2 through the aquastat switch ST which remains in open condition, whereby the auxiliary solar heat relay SR remains open.

If secondary stage heat is also called for, the relay H2 will be closed and will be supplying power from the hot terminal of the control power transformer TR to the terminal W2, and this power will directly energize the heat strip relay HR, thereby turning on the resistant heat strips HTR to add to the heat supplied by the compressor of the building heating and cooling system.

However, in the event that adequate solar source medium temperature exists, the aquastat switch ST will be closed, and therefore power from the hot side of the control power transformer TR will be supplied through the thermostat H1, through the input terminal W1, and through the terminal A1 to the terminal A2, whereby to energize the relay K4, assuming that the relay contacts K3A and K2A remain closed. Thus, the solar heat pump will be energized through the relay contact K4A when the relay K4 closes, thereby running the solar heat pump SP to supply heat to the exchanger HE in the building ducts D, which heat is then circulated by the fan under the control of the relay FR.

However, if secondary stage heat is also called for by closing of the relay H2, the appearance of power at the terminal W2 will energize the relay K2, thereby opening the contacts K2A. As a result, whenever the thermostat H2 is closed, the relay K4 will be opened since the contact K2A is open, thereby de-energizing the solar heat pump relay SR and eliminating auxiliary solar heat as a source.

On the other hand, if demand for secondary stage heat ceases as indicated by opening of the relay H2, then the relay K4 will close, assuming that the contacts K3A and K2A remain closed. As a result power will be supplied to the auxiliary solar relay SR through the now closed contacts K4A. The relay K4, which is still closed, causes the contacts K4B to be open, thereby eliminating power flow to the compressor CM and to the reverse valve relay RVR, thereby opening the contacts RV1 and disabling the compressor relay CR. As a result, since the relays K1 and K4 are closed, power is delivered to the circulating fan relay FR through the contacts K1C, and power is delivered to the solar source relay SR through the contacts K4A, whereby the primary stage heat from the reversible heat pump is eliminated and heat from the auxiliary solar source is substituted in its place for circulation by the duct circulation fan DF under the control of the relay FR.

As stated above, it does not matter whether the solar source is available or not when the secondary stage thermostat H2 is closed, because the closure of the secondary source thermostat H2 energizes the relay K2 thereby de-energizing the relay K4.

In the cooling mode as shown in FIG. 1, the relay K1 is open since the contacts H1 of the thermostat are open. Instead, the cooling thermostat C1 will be closed, thereby supplying power from the hot side of the power transformer TR, through the terminals Y to the switch segment S1. This power will flow through the normally closed contact K1D, thereby directly energizing the compressor relay CR. Since the compressor reverse valve RVR is not energized when the contacts C1 are closed, the reversing valve relay contacts RV1 will be open, whereby the reversing valve will be in the normal cooling mode position so that the compressor will supply cool air into the ducts D of the building to be circulated by the circulation fan DF. Moreover, power will be supplied from the cooling thermostat C1 through the fan switch FS and the terminals G and the normally closed contacts K1B, so that the circulation fan DF will be turned on by its relay FR. Since the thermostat H1 is open, no power will be supplied to the aquastat terminals A1, whereby no power can be supplied to the solar source relay SR. In this way, it is impossible for the solar medium to be circulated through the heat exchanger HE in the ducts D of the building when the system is operating in the cooling mode.

Referring now to FIG. 2, this figure is essentially the same as FIG. 1 as far as the interface located within the dashed box is concerned. The only difference within the box is that the switch S has been moved downwardly into its lowermost position which is the position required for use with a building heating system using a heat pump whose compressor CM is normally in the heating mode instead of the cooling mode as shown in FIG. 1. Also, there is a connection to the terminal O, but no connection to the terminal W1 since a different building thermostat is used.

The operation of the circuit of FIG. 2 will be described with reference to the various possible types of heating and cooling demanded of the system. First, assuming that inadequate solar heat is available because the temperature of the medium as measured by the aquastat T is too low, when heat is demanded by closing the primary thermostat H1, the closing of this thermostat puts 24 volt power from the hot side of the control power transformer TR arriving through the terminals R at the top of the figure, through the primary thermostat H1 which delivers power through the input Y terminals to the switch segment S1 which then energizes the winding of the relay K1 whose other side is connected to the common power terminal C. Energizing of the relay K1 thereby closes the terminals K1A and energizes the compressor relay CR to start the compressor CM. Since the compressor is in the normal heating mode already, it is not necessary to energize the reverse valve relay RVR. The closing of the relay K1 opens the terminals K1B, but closes the terminals K1C to deliver power through the terminals G to the circulation fan relay FR. Thus, the compressor generates heat for circulation in the building duct D by the circulation fan DF.

Conversely if adequate solar heat is available as indicated by closing of the aquastat T which measures the temperature of the solar storage medium, then power will be supplied through the terminals A1, the aquastat switch ST and the terminals A2, and this power will close the relay K4 whose other side is connected through the normally closed contacts K3A and K2A to the common terminal. Energizing of the winding of the relay K4 closes the contacts K4A and thereby energizes through the terminals P the auxiliary solar heat pump relay SR. Moreover, closing of the relay K4 opens the contacts K4C and thereby disrupts the flow of power through the terminals Y to the compressor relay CR. However, since the relay K1 remains energized, the contacts K1C continue supplying power to close the circulating fan relay FR. Thus, when adequate temperature exists in the solar storage medium, the fan DF continues to run in the building ducts D and the auxiliary solar heat pump SP continues to operate through the relay SR, but the compressor relay CR is de-energized by opening of the contacts K4C.

When a higher degree of heating is required, due for instance to severe temperature conditions, the thermostat H2 also closes, and under these circumstances, solar heat is never substituted for heat generated by the compressor of the reversible heat pump. The closing of the thermostat H2 energizes the contacts W2, thereby closing the heat strip relay HR and also energizing the relay K2 which opens the normally closed contacts K2A, thereby de-energizing the relay K4 to open the contacts K4A and disable the auxiliary solar heat pump relay SR. In this manner the relay K4 is de-energized regardless of whether or not the aquastat T shows adequate temperature of the solar storage medium, i.e, whenever the secondry heat thermostat H2 has been closed.

In the cooling mode of the thermostat system of FIG. 2, both the thermostat contacts C0 and C1 are closed. Closing of the thermostat contact C0 applies a control voltage from the hot side of the control power transformer TR to the O terminal and to the switch segment S3. It also closes the relay K3, thereby opening the contacts K3A, completely disabling the auxiliary solar heat system to ensure that no heat can be supplied when cooling is demanded. Power through the switch segment S3 is also applied to the W1 terminals thereby reversing the reverse valve relay RVR and changing the compressor to the cooling mode. Current through the other closed cooling thermostat contact C1 also applies power through the terminals Y to actuate the relay K1. Power on the terminal Y also passes through the closed contacts K4C and through the newly closed contacts K1A so as to energize the compressor relay CR and start the compressor CM running, the compressor now being in the cooling mode because of energizing of the RVR relay. Since the relay K1 is closed, the contacts K1C are also closed, thereby energizing the duct circulating fan relay FR. Thus, the system runs in the cooling mode while ensuring that the solar heat system is disabled by opening of the contacts K3A.

This invention is not to be limited to the exact forms shown in the drawings, for obviously changes may be made within the scope of the following claims.

We claim:
1. In building heating and cooling apparatus including building heating and cooling thermostats connected through terminals to relays controlling a building fuel-consuming heating and cooling system and controlling a building duct air circulating fan wherein said relays are energized by power from a building control voltage transformer, an interface control to be interposed at said terminals between the building thermostats and the building heating and cooling system relays for introducing and controlling an auxiliary solar heat system having a thermal storage medium circulated by a pump into heat exchange relationship with said duct, the temperature of the medium being measured by an aquastat including a heat-responsive switch, said interface comprising:

an electrical circuit having thermostat and heating and cooling and fan terminals corresponding with and interposed between the terminals of the building thermostats and of the building heating and cooling and fan system, and the circuit additionally having solar system aquastat and pump terminals;

first relay means in the electrical circuit having contacts operative upon closing of a building heating thermostat to deliver power to the building heating system and to the aquastat switch;

solar system relay means responsive to power delivered to the aquastat switch when closed and having contacts operative to interrupt power through the first relay contacts to the building heating system and operative to deliver power to the solar system circulation pump;

means to energize the air circulation fan of the building when a thermostat is closed; and third relay means operative when a building cooling system thermostat is closed and having contacts connected to interrupt the solar system relay means and prevent it from energizing the solar system circulation pump.

2. The interface as set forth in claim 1, wherein the building heating system has a primary heating stage and a secondary heating stage each responsive to separate building heating thermostats, the first relay means being responsive to closure of the primary heating thermostat; and the circuit further including second relay means responsive to closure of the secondary heating thermostat and having contacts connected to interrupt the solar system relay means and prevent it from interrupting power to the primary building heating system and from delivering power to the solar system circulation pump.

3. The interface as set forth in claim 1, wherein the building heating and cooling system comprises a reversible heat pump including a compressor and a compressor reversing valve which may be normally in the cooling mode, or in a different heat pump may be normally in the heating mode, the compressor and the reversing valve being respectively controlled by building relays, and the interface circuit being connected to energize the compressor relay when the cooling thermostat is closed, or in said different heat pump when the heating thermostat is closed and the aquastat switch is open; and the interface circuit further including a switch moveable between a first selectable position to connect the reversing relay to be energized when the heating thermostat is closed, and a second selectable position for use with said different heat pump to connect the reversing relay to be energized when the cooling thermostat is closed depending upon the type of heat pump to which the interface is being connected.

* * * * *